US012546209B2

(12) United States Patent
Hall

(10) Patent No.: US 12,546,209 B2
(45) **Date of Patent: *Feb. 10, 2026**

(54) HORIZONTAL DIRECTIONAL DRILLING AREA NETWORK AND METHODS

(71) Applicant: Merlin Technology, Inc., Kent, WA (US)

(72) Inventor: Thomas J. Hall, Bainbridge Island, WA (US)

(73) Assignee: Merlin Technology, Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,795

(22) Filed: Feb. 13, 2024

(65) Prior Publication Data

US 2025/0257644 A1 Aug. 14, 2025

Related U.S. Application Data

(63) Continuation of application No. 17/316,021, filed on May 10, 2021, now abandoned, which is a (Continued)

(51) Int. Cl.
*E21B 7/04* (2006.01)
*E21B 43/30* (2006.01)

(Continued)

(52) U.S. Cl.
CPC .............. *E21B 47/024* (2013.01); *E21B 7/04* (2013.01); *E21B 7/046* (2013.01); *E21B 43/305* (2013.01);

(Continued)

(58) Field of Classification Search
None
See application file for complete search history.

(56) References Cited

U.S. PATENT DOCUMENTS 4,285,236 A 8/1981 Chien
5,553,407 A 9/1996 Stump (Continued)

FOREIGN PATENT DOCUMENTS

CN 101949286 A 1/2011
GB 2390864 A 1/2004

(Continued)

OTHER PUBLICATIONS

The International Preliminary Report on Patentability for International Application No. PCT/US2013/020556 which is associated with U.S. Appl. No. 13/734,841, filed Apr. 30, 2014, Alexandria, VA.

(Continued)

*Primary Examiner* — Quan Zhen Wang
*Assistant Examiner* — Jerold B Murphy
(74) *Attorney, Agent, or Firm* — Pritzkau Patent Group LLC; Michael M Pritzkau

(57) ABSTRACT

A drilling area network hub is located proximate to a drill rig and includes an uphole transceiver in bidirectional communication with a downhole transceiver by utilizing the drill string as an electrical conductor. Certain information is collected including rig-based and/or location information. At least one field report is generated based on the certain information to characterize at least one of an inground operation, an operational condition of the downhole transceiver, an operational condition of the uphole transceiver, and an operational condition of the drill rig. A drilling area network server receives the field report from the Internet at a remote location and can generate a custom report and/or recommended actions based on field data. Region specific parameters can be applied to the operation of a drilling system. The drilling area network hub can transfer data logs to the remote location according to assigned priorities.

13 Claims, 7 Drawing Sheets

Related U.S. Application Data continuation of application No. 16/382,198, filed on Apr. 12, 2019, now Pat. No. 11,002,129, which is a continuation of application No. 15/792,502, filed on Oct. 24, 2017, now Pat. No. 10,267,143, which is a continuation of application No. 14/949,712, filed on Nov. 23, 2015, now Pat. No. 9,810,055, which is a continuation of application No. 13/734,841, filed on Jan. 4, 2013, now Pat. No. 9,194,228.

(60) Provisional application No. 61/584,231, filed on Jan. 7, 2012.

(51) Int. Cl.

| | |
|---|---|
| ***E21B 44/00*** | (2006.01) |
| ***E21B 47/02*** | (2006.01) |
| ***E21B 47/0232*** | (2012.01) |
| ***E21B 47/024*** | (2006.01) |
| ***E21B 47/09*** | (2012.01) |
| ***E21B 47/12*** | (2012.01) |
| ***E21B 47/13*** | (2012.01) |
| ***G01V 11/00*** | (2006.01) |

(52) U.S. Cl.

CPC .............. *E21B 44/00* (2013.01); *E21B 47/02* (2013.01); *E21B 47/0232* (2020.05); *E21B 47/09* (2013.01); *E21B 47/12* (2013.01); *E21B 47/13* (2020.05); *G01V 11/002* (2013.01)

(56) References Cited

U.S. PATENT DOCUMENTS

| | | | | |
|---|---|---|---|---|
| 5,878,824 | A * | 3/1999 | Mercer | E21B 7/06 175/24 |
| 6,199,643 | B1 * | 3/2001 | Hesse | E21B 7/24 175/19 |
| 6,315,062 | B1 | 11/2001 | Alft et al. | |
| 6,389,360 | B1 | 5/2002 | Alft et al. | |
| 6,496,008 | B1 | 12/2002 | Brune et al. | |
| 6,719,069 | B2 | 4/2004 | Alft et al. | |
| 6,727,704 | B2 | 4/2004 | Brune et al. | |
| 6,737,867 | B2 | 5/2004 | Brune et al. | |
| 6,749,029 | B2 * | 6/2004 | Alft | E21B 47/0232 702/9 |
| 6,755,263 | B2 | 6/2004 | Alft et al. | |
| 7,400,976 | B2 | 7/2008 | Young et al. | |
| 7,425,829 | B2 | 9/2008 | Zeller et al. | |
| 7,775,301 | B2 | 8/2010 | Brune et al. | |
| 8,044,821 | B2 | 10/2011 | Mehta | |
| 8,499,646 | B2 | 8/2013 | Chau et al. | |
| 8,729,901 | B2 | 5/2014 | Lam et al. | |
| 9,000,940 | B2 | 4/2015 | Chau et al. | |
| 9,194,228 | B2 * | 11/2015 | Hall | E21B 47/0232 |
| 9,274,243 | B2 | 3/2016 | Chau et al. | |
| 9,500,041 | B2 | 11/2016 | Chau et al. | |
| 9,810,055 | B2 | 11/2017 | Hall | |
| 10,267,143 | B2 | 4/2019 | Hall | |
| 11,002,129 | B2 * | 5/2021 | Hall | E21B 7/04 |
| 2002/0116129 | A1 | 8/2002 | Alft et al. | |
| 2002/0184235 | A1 | 12/2002 | Young et al. | |
| 2003/0074139 | A1 | 4/2003 | Poedjono | |
| 2005/0046592 | A1 | 3/2005 | Cooper et al. | |
| 2005/0278123 | A1 | 12/2005 | Alft et al. | |
| 2006/0285436 | A1 | 12/2006 | Mayorga Lopez et al. | |
| 2007/0240903 | A1 | 10/2007 | Alft et al. | |
| 2008/0291918 | A1 * | 11/2008 | Turcot | H04Q 3/0087 370/395.3 |
| 2009/0090555 | A1 | 4/2009 | Boone et al. | |
| 2010/0116550 | A1 | 5/2010 | Hutin et al. | |
| 2011/0001633 | A1 | 1/2011 | Lam et al. | |
| 2011/0137618 | A1 * | 6/2011 | Fluharty, II | E21B 7/046 702/6 |
| 2011/0162891 | A1 | 7/2011 | Camp | |
| 2015/0090496 | A1 * | 4/2015 | Rempe | G01V 3/30 175/45 |

FOREIGN PATENT DOCUMENTS

| | | | |
|---|---|---|---|
| RU | 2401931 | C2 | 10/2010 |
| WO | 0121927 | A2 | 3/2001 |
| WO | 03058029 | A1 | 7/2003 |

OTHER PUBLICATIONS

The First Office Action of the State Intellectual Property Office of People's Republic of China for Chinese Application No. 201380006984.8 which is associated with International Application No. PCT/US2013/020556 which is associated with U.S. Appl. No. 13/734,841, filed Aug. 25, 2016. (Machine translation included).

The International Search Report and the Written Opinion of the International Searching Authority for International Application No. PCT/US2013/020556 which is associated with U.S. Appl. No. 13/734,841, filed Apr. 11, 2013, Moscow, Russia.

The Second Office Action of the State Intellectual Property Office of People's Republic of China for Chinese Application No. 201380006984.8 which is associated with International Application No. PCT/US2013/020556 which is associated with U.S. Appl. No. 13/734,841, filed May 12, 2017. (Machine translation included).

The Third Office Action of the State Intellectual Property Office of People's Republic of China for Chinese Application No. 201380006984.8 which is associated with International Application No. PCT/US2013/020556 which is associated with U.S. Appl. No. 13/734,841, filed Nov. 16, 2017. (Machine translation included).

The First Office Action of the State Intellectual Property Office of People's Republic of China for Chinese Application No. 201810765347.3 which is associated with International Application No. PCT/US2013/020556 which is associated with U.S. Appl. No. 13/734,841, filed Jun. 15, 2021. (Machine translation included).

The Second Office Action of the State Intellectual Property Office of People's Republic of China for Chinese Application No. 201810765347.3 which is associated with International Application No. PCT/US2013/020556 which is associated with U.S. Appl. No. 13/734,841, filed Apr. 7, 2022. (Machine translation included).

* cited by examiner

HORIZONTAL DIRECTIONAL DRILLING AREA NETWORK AND METHODS

RELATED APPLICATION

The present application is a continuation application of copending U.S. patent application Ser. No. 17/316,021, filed on May 10, 2021, which is a continuation application of U.S. patent application Ser. No. 16/382,198, filed on Apr. 12, 2019 and issued as U.S. Pat. No. 11,002,129 on May 11, 2021, which is a continuation application of U.S. patent application Ser. No. 15/792,502 filed on Oct. 24, 2017 and issued as U.S. Pat. No. 10,267,143 on Apr. 23, 2019, which is a continuation application of U.S. patent application Ser. No. 14/949,712 filed on Nov. 23, 2015 and issued as U.S. Pat. No. 9,810,055 on Nov. 7, 2017, which is a continuation application of U.S. patent application Ser. No. 13/734,841 filed on Jan. 4, 2013 and issued as U.S. Pat. No. 9,194,228 on Nov. 24, 2015, which claims priority from U.S. Provisional Patent Application Ser. No. 61/584,231 filed on Jan. 7, 2012, each of which are incorporated herein by reference in their entirety.

BACKGROUND

The present application is at least generally related to horizontal directional drilling operations and, more particularly, to a system, apparatus and methods involving a horizontal directional drilling area network.

Traditional horizontal directional drilling systems often utilize a number of components such as an inground transmitter, a drill rig and a handheld locator. Applicants recognize that communications between these components have typically been limited to minimum functional requirements that are necessary to successfully complete a particular inground operation such as, for example, forming a borehole and subsequent back-reaming to install a utility within the ground.

Because of the complexity of the equipment that makes up an overall modern horizontal directional drilling system, an operator can be responsible for many aspects of system operation, often with little or no external or remote oversight. Applicants recognize a number of concerns in this regard. One area of concern relates to component and system maintenance. In some cases, component or system failure can result due to a failure to follow manufacturer specified maintenance procedures. Another area of concern resides in the need to carefully monitor certain operational parameters as an inground operation is performed to insure that an installed utility is not damaged by the inground operation, to ensure that an inground operation is performed in compliance with a permit or simply to provide supervisory oversight from a remote location, for example, to allow one supervisor to oversee multiple boring projects at once.

Moreover, recording the operational parameters of an inground operation into an "as-built" drawing is becoming a common practice, and in some cases is now a requirement imposed on contractors as a condition to being awarded a project or as a condition to being paid for such project. Applicants recognize that apparatus for recording such data and producing such as-built drawings in horizontal directional drilling projects are currently very limited, and do not allow for remote data storage.

Still another area of concern involves the wide range of regulations that can be imposed by governmental entities with respect to performing an inground operation in a given region, as will be further discussed.

Finally, Applicants recognize that as competition increases in the horizontal directional drilling industry, current systems would limit the ability of companies who provide products and services in this industry to increase sales opportunities and to better service their customers.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Generally, an arrangement, apparatus and associated methods are described for use in conjunction with a system that performs horizontal directional drilling, including a drill rig and a subsystem for monitoring the location of an inground tool along an underground borepath and other operational parameters relating to the underground borepath. A downhole transceiver is supported proximate to the inground tool which is configured for bidirectional communication including receiving operational instructions from above ground and transmitting locating and operational data. A drilling area network hub can be located at the drill rig and includes an uphole transceiver that is configured for data communication with the downhole transceiver for bidirectional communication between the inground tool and the drill rig by utilizing the drill string as an electrical conductor, a data communication arrangement at least for monitoring at the drill rig to generate certain information including at least one of location information and rig-based information, a processor for collecting the certain information for generating at least one field report based on the certain information which field report is related to at least one of the inground operation, an operational condition of the downhole transceiver, an operational condition of the uphole transceiver, and an operational condition of the drill rig, and an Internet connection arrangement that is configurable at least for intermittent data communication with the Internet for transferring the field report to a remote location.

In another aspect of the disclosure, a drilling area network hub is located proximate to the drill rig at least for collecting system-generated borepath data that characterizes the borepath and system-related operational data for generating at least one field report and one or more recommended actions based on the borepath data and the operational data to characterize at least one of the inground operation and an operational condition of the drill rig. An Internet connection arrangement can form part of the drilling area network hub and is configured at least for intermittent data communication with the Internet for transferring the field report to a remote location. A drilling area network server receives the field report from the Internet at the remote location and generates a custom report based on the field report.

In another aspect of the disclosure, an apparatus and associated method monitor a horizontal directional drilling system that is configured to perform an inground operation, including a drill rig and a subsystem for monitoring the location of an inground tool along an underground borepath and other operational parameters relating to the underground borepath. An application is configured to receive system-generated borepath data that characterizes the underground borepath and system-related operational data at a location that is remote from the site of the underground borepath via remote electronic data transmission, and to generate at least one of a customized report and one or more recommended actions based on the borepath data and the operational data.

In still another aspect of the disclosure, an apparatus and associated method are configured for customizing one or more configurable components of a horizontal directional drilling system based on region specific parameters. The horizontal directional drilling system includes a drill rig and a subsystem for monitoring the location of an inground tool along an underground borepath and other operational parameters relating to the underground borepath. A geographic database of region specific parameters specifies operational parameters based on location for one or more components of the system. An arrangement is provided for identifying a current location of at least one locatable component of the system in the region and correlating the current location with the geographic database to identify a set of local requirements for the current location. A controller customizes at least one operational parameter of the one or more configurable components based on the current location to conform to the set of local requirements. Operational parameters which can be configured as a result of such requirements may include, without limitation, transmission frequency and maximum transmission power. In a feature, the system can be automatically configured to conform to the region specific parameters.

In yet another aspect of the disclosure, an arrangement and associated method monitor a system that performs horizontal directional drilling, including a drill rig and a subsystem for monitoring the location of an inground tool along an underground borepath and other operational parameters relating to the underground borepath. A drilling area network hub is located proximate to the drill rig for generating a plurality of data logs of differing types that characterize the inground operation as the inground operation is performed along a borepath and the drilling area network hub is configured at least for intermittent data communication with a remote location. A priority table applies a priority ranking to the differing types of the data logs such that the drilling area network hub transfers the data logs to the remote location according to the priority table.

BRIEF DESCRIPTIONS OF THE DRAWINGS

Exemplary embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents. It is noted that the drawings are not to scale and are diagrammatic in nature in a way that is thought to best illustrate features of interest. Descriptive terminology may be adopted for purposes of enhancing the reader's understanding, with respect to the various views provided in the figures, and is in no way intended as being limiting.

Figure 1:
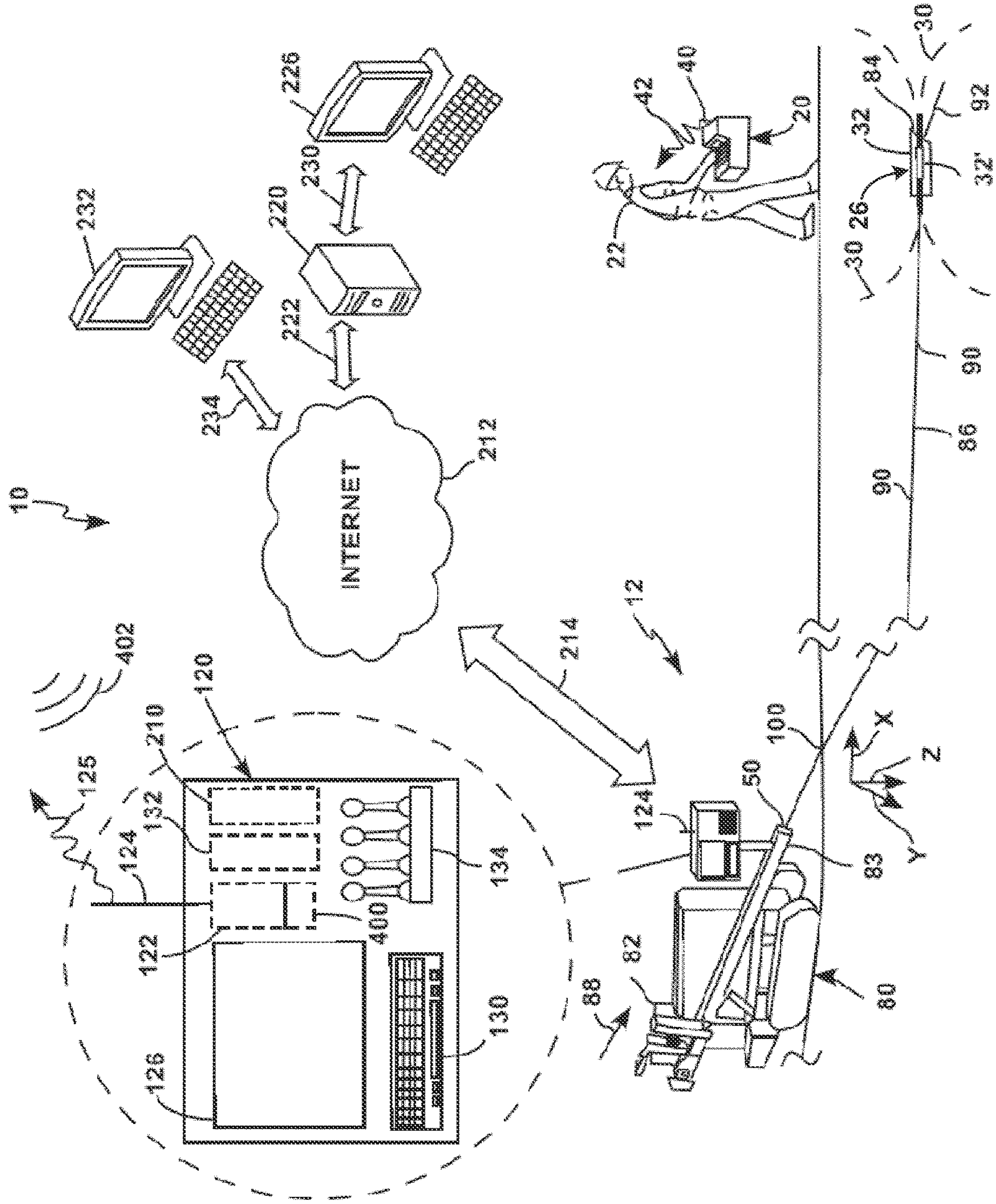
FIG. 1 is a diagrammatic view, in elevation, of a drilling area network and its components operating as part of a horizontal directional drilling system according to the present disclosure.

Turning now to the drawings, wherein like items may be indicated by like reference numbers throughout the various figures, attention is immediately directed to FIG. 1, which illustrates an embodiment of a drilling area network, generally indicated by the reference number 10, used in conjunction with a system 12 for performing an inground operation. The system includes a portable device 20 that can be carried by an operator 22. Device 20 is configured for receiving an electromagnetic locating signal 30 that is transmitted from an inground device such as, for example, a boring tool 32. The locating signal can be a dipole signal. In this instance, the portable device can correspond, for example, to the portable device described in any of U.S. Pat. Nos. 6,496,008, 6,737,867, 6,727,704, as well as U.S. Published Patent Application no. 2011-0001633 each of which is incorporated herein by reference. In view of these patents, it will be appreciated that the portable device can be operated in either a walkover locating mode, as illustrated by FIG. 1, or in a homing mode having the portable device placed on the ground, as illustrated by the U.S. Pat. No. 6,727,704. While the present disclosure illustrates a dipole locating field transmitted from the boring tool and rotated about the axis of symmetry of the field, the present disclosure is not intended as being limiting in that regard. Many suitable system configurations can be implemented. For example, a locating field can be transmitted from the portable device itself as seen at least in FIGS. 18a and 18b of U.S. Pat. No. 7,425,829 and FIG. 3b of U.S. Pat. No. 7,775,301 each of which is incorporated by reference. It is noted that a magnetic dipole field is rotated in the latter patents by rotation about an axis that is transverse to the axis of symmetry of the field. In such a system, a receiver in the boring tool can detect the rotating magnetic field transmitted from the portable device such that the receiver in the boring tool generates position related data that is transferred in a suitable way to the drill rig. Still another type of system does not require a portable device for purposes of tracking the inground tool or transmitting a locating signal. For example, some prior art systems can track the location of an inground tool by integrating orientation parameters transferred from the inground tool to the drill rig through the drill string and/or by utilizing an inertial navigation system that is supported by the inground tool. Accordingly, the system and associated methods described herein are considered by Applicants as capable of utilizing any information that is generated by any component of the system so long as the information is related to the operation that is being performed. The portable device or any other above ground system component can include a GPS (Global Positioning System) receiver for determining the position of the components at any appropriate time during operation. The GPS components may be survey grade in order to provide enhanced position determination accuracy.

Returning to the discussion of FIG. 1, locating signal 30 can be modulated with information generated in the boring tool including, but not limited to position orientation parameters based on orientation sensor readings, temperature values, pressure values, battery status, tension readings in the context of a pull-back operation, and the like. In this regard, portable device 20 includes a telemetry arrangement having a telemetry antenna 40 that transmits a telemetry signal 42. For the moment, it is sufficient to note that the telemetry signal can be used to convey any information that is modulated on the locating signal to other above ground locations such as the drill rig. It should be appreciated that the inground device is not limited to a boring tool since other types of inground device can transmit a locating signal. Another suitable type of inground device, for example, is a reamer for use in a pull-back operation to install a utility line in a previously formed borehole. It is noted that, as an alternative to modulating the locating signal, the subject information can be carried up the drill string to the drill rig using electrical conduction such as a wire-in-pipe arrangement. In another embodiment, bi-directional data transmission can be accomplished by using the drill string itself as an electrical conductor. By way of example, a current transformer 50 can be in electrical communication with console 120 and in electromagnetic communication with drill string 100. It is noted that such a current transformer at the drill rig is well-known to those of ordinary skill in the art and typically uses a toroidal core surrounding the drill string. The toroidal core supports a toroid winding that couples to the electrically conductive drill via the core so that the drill string serves as a single turn winding to complete the current transformer. An advanced embodiment of a drill string communication system is described in commonly owned U.S. application Ser. No. 13/733,097, filed on Jan. 2, 2013, which is incorporated herein by reference in its entirety. In either case, all information is made available to console 120 at the drill rig.

Still referring to FIG. 1, system 12 further includes drill rig 80 having a carriage 82 received for movement along the length of an opposing pair of rails 83. Boring tool 26 includes an asymmetric face 84 and is attached at an opposing end to a drill string 86. Generally, drill string 86 is made up of a plurality of removably attachable drill pipe sections such that the drill rig can force the drill string into the ground using movement in the direction of an arrow 88 and retract the drill string responsive to an opposite movement. Joints 90 between adjacent ones of the drill pipe sections in the drill string are diagrammatically shown as vertical lines. The drill pipe sections can define a through passage for purposes of carrying a drilling mud or fluid 92 that is emitted from the boring tool under pressure to assist in cutting through the ground as well as cooling the drill head. Generally, the drilling mud also serves to suspend and carry out cuttings to the surface along the exterior length of the drill string. Steering can be accomplished in a well known manner by orienting asymmetric face 84 such that the boring tool is deflected in a desired direction in the ground responsive to forward, push movement which can be referred to as a "push mode." Rotation or spinning of the drill string by the drill rig will generally result in forward or straight advance of the boring tool which can be referred to as a "spin" or "advance" mode.

The present example contemplates movement of the boring tool within a master XYZ coordinate system. For purposes of simplicity, in the present example, the X axis can be at least generally coextensive with the surface of the ground and lie generally above an intended path of the boring tool, however, any other suitable arrangement of coordinate axes may be adopted. The origin of the master coordinate system is specified by reference numeral 100, and can coincide with the point where the boring tool enters the ground, although the coordinate axes are offset in the present view for purposes of illustrative clarity. While a Cartesian coordinate system is used as the basis for the master coordinate systems employed by the various embodiments which are disclosed herein, it is to be understood that this terminology is used for descriptive purposes and that any suitable coordinate system may be used. As noted, the X axis extends forward whereas the Y axis extends to the right when facing in the forward direction along the X axis and the Z axis is directed downward.

The drilling operation can be controlled by an operator (not shown) at a control console 120 which itself includes a telemetry transceiver 122 connected with a telemetry antenna 124 for transmitting a telemetry signal 125, a display screen 126, an input device such as a keyboard 130, a processing arrangement 132 which can include suitable interfaces and memory as well as one or more processors. A plurality of control levers 134, for example, control movement of carriage 82 as well as other functions of the drill rig. In an embodiment, screen 126 can be a touch screen such that keyboard 130 may be optional. It is noted that telemetry systems such as, for example, as formed between device 20 using signal 42 and the drill rig using signal 125 are typically subject to regulatory control at least with respect to transmission power and transmission frequency. Because this telemetry system can be configured on-the-fly with respect to both transmission power and frequency, it can be considered as one configurable component of the system.

Continuing to refer to FIG. 1, drilling area network (DAN) 10 can be considered to include components of the on-site telemetry system described above which can provide wireless bidirectional communication between portable device 20 and telemetry transceiver 122 at the drill rig. The DAN further comprises a DAN hub 210 that can be located at any suitable physical location such as, for example, in console 120 at the drill rig. The DAN hub is in data communication with drill rig 80 as well as with portable device 20 via telemetry transceiver 122. In one embodiment, drill rig 80 can be equipped with a controller area network bus (CAN-bus) for purposes of enabling and facilitating data communication. The CAN-bus operates according to a message-based protocol, which was initially designed for automotive applications but has rapidly expanded to use in other areas such as industrial and medical equipment. While specific details of the operation of the CAN-bus are beyond the scope of the present disclosure, it should be appreciated that the CAN-bus can readily be implemented for purposes of monitoring virtually any aspect of the operation of drill rig 80, at least some of which purposes will be described in detail at one or more appropriate points below. Moreover, it is noted that the DAN hub can be configured to cooperate to exchange information with any arrangement that is used to monitor and control the drill rig and is not limited to the CAN-bus.

DAN hub 210 is configurable for connection to the Internet 212 such as, for example, using a wireless connection as indicated by an arrow 214. The connection can be accomplished in any suitable manner such as, for example, using a cellular data connection, satellite data connection, WiFi connection according to well-known IEEE 802.11 standards or any other suitable form of wireless connection that is either currently available or yet to be developed. In this regard, a great deal of flexibility can be provided to the system operator. It should be appreciated that the specific type of Internet connection(s) that are available can vary from the location of one inground operation to the next such that a given DAN can be implemented to accommodate more than one type of Internet connection. Moreover, the system operator can even elect to connect via WiFi to a cellular telephone that is configured to serve as a WiFi hotspot which can provide significant data bandwidth. A DAN server 220 can communicate with DAN hub 210 via the Internet. For example, the DAN hub can send operational data to the DAN server using web services, as will be further described. The DAN server can connect to the Internet in any suitable manner as illustrated by a connection 222. Users can connect to the DAN server in any suitable way. A first user computer 226 is shown directly connected to the DAN server via LAN 230 while a second user computer 232 is shown connected to the Internet via a connection 234 for remote or WAN connection to DAN server 220. User access to the DAN server can be via a standard Internet connection. While only two users have been shown for purposes of illustrative clarity, it should be appreciated that the DAN server can support a large number of users.

Figure 2:
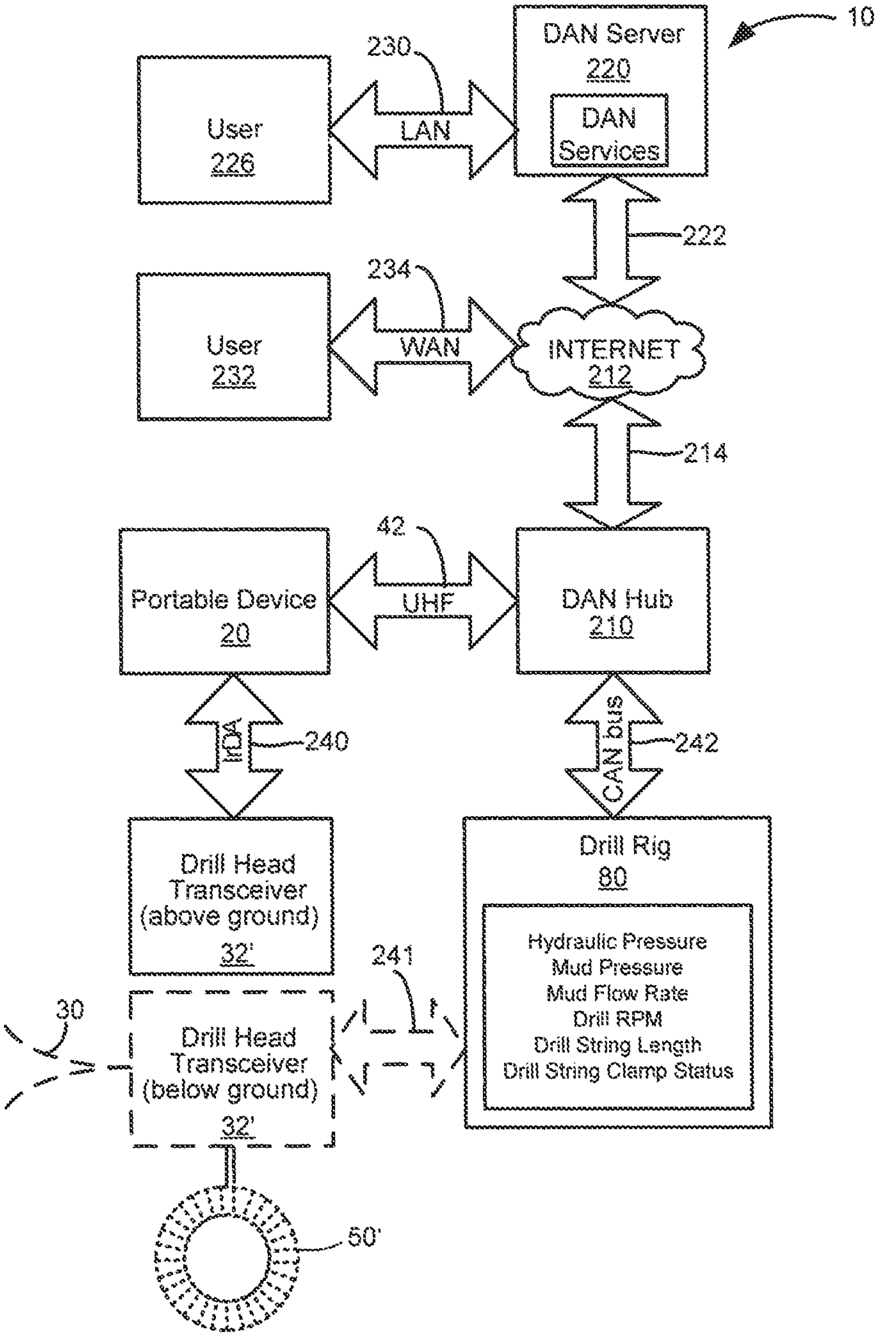
FIG. 2 is a block diagram illustrating an embodiment of the components of the drilling area network according to the present disclosure.

FIG. 2 is a block diagram that illustrates an embodiment of DAN 10 in a way that is consistent with FIG. 1. In this regard, it should be appreciated that the locating signal can be transmitted from a transceiver 32' that is removably installed in boring tool 32 of FIG. 1. In an embodiment, above ground data communication with transceiver 32' can be facilitated by an infrared (IrDA) connection 240 between the transceiver and the portable device. Such an infrared connection can be used, by way of example, to program the transceiver prior to a particular inground operation. Features of the transceiver that can be programmable include but are not limited to the carrier frequency of the locating signal, the signal strength and the baud rate. It should be appreciated that the connection to the drill head transmitter can be made in any suitable manner and is not limited to infrared. For example, this connection can be implemented via Bluetooth. In another embodiment, below ground communication with drill head transceiver 32' (shown in phantom) may occur using a communication link 241 that can couple data signals onto the drill string as electrical signals for bidirectional transfer using the drill string as an electrical conductor. Applicants have developed advanced drill string communication systems such as are described in above incorporated U.S. patent application Ser. No. 13/733,097. In an embodiment, drill head transceiver 32', which can be referred to interchangeably as a downhole transceiver, can be in electrical communication with a downhole current transformer 50' to implement link 241 thereby facilitating bidirectional communication with an inground end of the drill string in the same manner as previously described current transformer 50. Another suitable type of coupling arrangement proximate to the inground end of the drill string can form an electrically isolated gap in the electrical continuity of the drill string across which transceiver 32' is bridged. While such electrically isolating gaps are known in the art, advanced mechanisms are described, by way of example, in U.S. patent application Ser. No. 13/593,439, filed on Aug. 23, 2012, which is commonly owned with the present application and incorporated herein by reference. CAN-bus 242 is explicitly shown as extending between DAN hub 210 and drill rig 80. It should be appreciated that the CAN-bus can be implemented as part of processing section 132 at the drill rig. Telemetry signal 42 can be implemented in the UHF band, for example, at 464.5 MHz and is therefore designated accordingly. Any suitable set of parameters, including combinations of the parameters shown in FIG. 2, can be monitored with respect to the operation of the drill rig such as, for example, hydraulic pressure(s), mud pressure, mud flow rate, drill RPM, drill string length and drill string clamp status.

Referring collectively to FIGS. 1 and 2, DAN hub 210 can serve in the manner of a central controller for data flow in the Drilling Area Network. The DAN hub can collect data from portable device 20, transmitter 32', drill rig 80 and any other system component of interest. Collected data can be transferred to the DAN server for further processing and viewing using DAN services, yet to be described. The DAN hub can receive remote data from the DAN server for further processing, viewing and/or forwarding to portable device 20, drill head transmitter 32' or drill rig 80. Data that can be collected by the DAN Hub and remotely stored includes but is not limited to:

- Data logs that are created during boring operations that include information such as:
  - The depth of the drill head at various points during a bore
  - The pitch of the drill head at various points during a bore
  - The temperature of the drill head at various points during a bore
  - The annular fluid pressure at the drill head at various points during a bore
  - The tension on a pull-back utility at various points during a pull-back
  - GPS coordinates of the portable device, drill rig and any other system components
  - Status of the portable device or locator
  - Status of drill head transmitter or transceiver
- With regard to data logs, different types of data logs can be handled in different ways. As one example, tension data in a pull-back operation can be considered as a high priority such that a tension data log can be transferred prior to other types of data logs. Transfer of data logs can be prioritized, for example, based on predefined threshold limits for each data log type. For example, a fluid pressure log can be associated with a maximum pressure value. If the maximum pressure is violated, the pressure log can be flagged in a suitable manner and transferred to the DAN server. In the instance of violation of a predefined threshold, the associated data log can be transferred incrementally. A predefined user can also be notified whenever a predefined threshold is violated, for example, by email. Table 1 illustrates an embodiment of one priority system, although any suitable embodiment can be used without limitation.

TABLE 1

| Priority Assignment | Type of Data Log | Threshold Value |
|---|---|---|
| 1 | Pull-back Tension | Utility Based $T_{max}/\Delta T_{max}$ |
| 2 | Annular Fluid Pressure | Utility/Inground Operation Based |
| 3 | Drillhead Temperature | $t_{max}/\Delta t_{max}$ |
| 4 | As-Built Data | N/A |
| 5 | DAN Component Status and Data | N/A |
| 6 | GPS Coordinates | $(+/-)D_{min}$ |

Data log transfer can proceed according to Table 1 during normal operation of the system. In the event that thresholds for two or more different types of data logs are simultaneously violated or at least violated in an overlapping manner, arbitration can be performed according the priority assignments of Table 1. In an embodiment, threshold values can be determined as a function of the product specifications for the utility that is being installed during a pull-back operation. For example, when pulling plastic pipe, the pull-back tension threshold can be far different than the threshold as compared to pulling steel pipe. Accordingly, Table 1 indicates that the threshold for pull-back tension can be utility based. Given the manufacturer specification for a utility, a maximum pull-back tension $T_{max}$ can be specified. Either alone or in combination with $T_{max}$, a maximum rate of change in tension $\Delta T_{max}$ can be specified. Likewise, the resistance of a utility to annular fluid pressure can vary greatly on the basis of the type of material from which the utility is formed. Hence, Table 1 indicates that the threshold for annular fluid pressure can be based on the type of utility and/or the type of inground operation that is being performed. Again, a maximum annular pressure value and/or a maximum rate of change in annular pressure can be specified.

It is further recognized that the annular pressure can be subject to different thresholds with respect to drilling a pilot bore to form a borepath versus a pull-back operation to install a utility along that same borepath. In an embodiment, at least some threshold values can be provided on the basis of multiple copies of Table 1 that can be indexed based on different types of inground operations as well as the type of utility that is being installed. In the instance of drillhead temperature, a threshold can be based on a maximum temperature $t_{max}$ and/or a maximum rate of temperature change $\Delta t_{max}$. By way of non-limiting example, a maximum temperature of 45° C. can be useful, for example, based on the temperature limitations of any electronics carried by the inground tool. Such a fixed threshold is useful to indicate that the temperature is slowly trending upward. The operator can take actions such as slowing down the advance rate/rotation rate of the drill string while drilling or back reaming and/or increasing the volume of drilling fluid to provide cooling. As another example for $\Delta t_{max}$, a temperature rise from 30° C. to 60° C. in the span of one minute can serve as a useful threshold. This type of threshold is useful, for example, when rock is encountered and the temperature is rapidly increasing. For purposes of GPS coordinates, many GPS systems offer an indication of accuracy in relation to a currently indicated location. That is, the GPS gives some plus or minus tolerance distance from the currently indicated location. Thus, a minimum accuracy can be specified which is indicated as (+/−) $D_{min}$ in Table 1.

Figure 3:
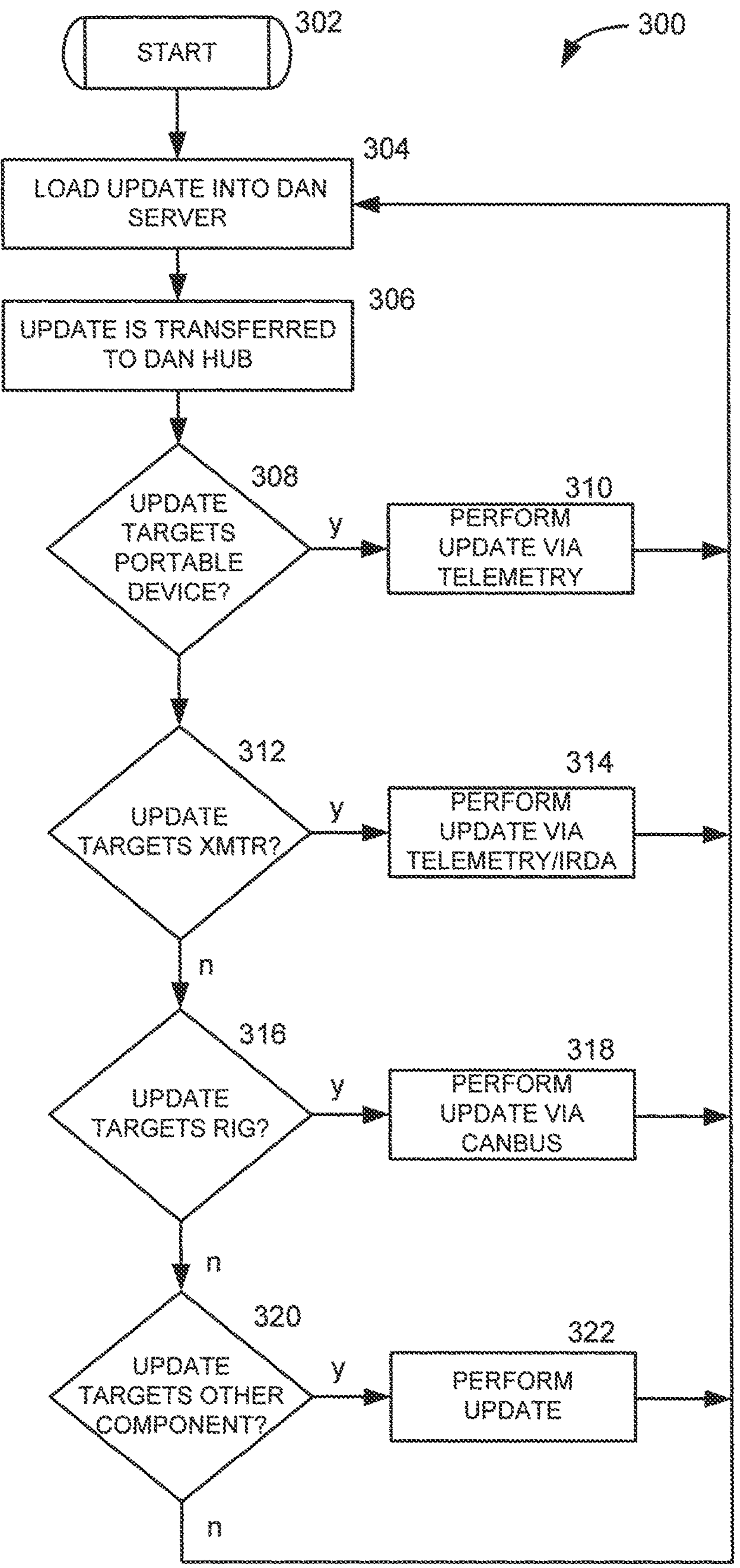
FIG. 3 is a flow diagram that illustrates an embodiment of a method for performing drilling area network updates.

- Status of the portable device.
  - In this regard, a wide variety of data can be transferred via telemetry from the portable device to the DAN hub and subsequently stored and made available on the DAN server. Such data can include, but is not limited to battery condition, number of hours of operation remaining based on current battery condition, software version, number of hours of operation, the serial number of the device, a customer asset number, optional features that have been installed, fault logs, current latitude/longitude location, and the like. The DAN hub can perform preprocessing on the data prior to transfer to the DAN server, although no requirement is imposed in this regard. Such preprocessing can be based, at least in part, on the available bandwidth for Internet access or based on a priority need for the data at the DAN server. For example, data relating to the bore path for purposes of constructing an as-built drawing of the bore path can be of high priority when there is a desire to remotely monitor the progress of the inground operation in real time. As another example, preprocessing can be based on identifying violations of predefined threshold values, as described above.
- Status of drill head transmitter 32'
  - Much of the same information referenced above with respect to the portable device may be transmitted and remotely monitored or stored with respect to drill head transmitter 32', including without limitation battery condition and number of hours of operation remaining based on current battery condition.
- Status of the drill rig
  - Through the CAN-bus interface, the DAN Hub can compile rig usage statistics, alerts and other information critical to the proper maintenance of the rig.
- Status of the DAN Hub DAN Services DAN Server 220 can process data collected by DAN Hub 210 to provide DAN Services such as, for example:

- Access to data logs collected during boring operations that can be used to generate "as built" drawings
- Remote monitoring of the progress of a particular boring operation.
- Access to the status of all devices in the DAN, including the DAN Hub, portable device(s), drill head transmitter and drill rig DAN Server 220 can push data to DAN devices, including:

- Software updates for portable device 20
- Software updates for drill head transmitter 32'
- Software updates for drill rig 220
- Software updates for DAN Hub 210 including, for example, purchased applications that can be loaded and executed on-the-fly
- Map data from Geographical Information Services that is displayed on screen 126
- Other data such as information and advertising FIG. 3 is a flow diagram which illustrates an embodiment of a method, generally indicated by the reference number 300, for performing DAN component updates. The method begins at 302 and proceeds to 304 for loading an update into DAN server 220 (FIGS. 1 and 2). The update can be placed onto the DAN server, for example, by either LAN user 226 or WAN user 234. The update can then be transferred at 306 to DAN hub 210. Of course, the update can be transferred to any number of DAN hubs since the update can be directed to any number of like DAN components that can be distributed worldwide. Step 308 determines whether the update is directed to portable device 20. If so, operation proceeds to 310 which transfers the update to the portable device via telemetry transceiver 122, for example, on a UHF frequency band. The portable device can then execute the update. If step 308 determines that the update is not directed to the portable device, operation proceeds to 312 which determines whether the update is targeted to drill head transmitter 32'. If so, operation proceeds to 314 for transfer of the update to the drill head transmitter via the IrDA link. If the drill head transmitter is currently engaged in an inground operation, of course, the update cannot be performed until the drill head transmitter is available above ground. If step 312 determines that the update is not directed to the drill head transmitter, operation proceeds to 316 which determines whether the update is directed to drill rig 80. If so, at 318, the update is transferred to the drill rig via the CAN-bus for installation via CAN-bus protocol. If step 316 determines that the update does not target the drill rig, operation proceeds to 320 which checks whether the update is directed to some other DAN component such as, for example, a tension monitoring arrangement that is used during a pull-back operation. If so, operation proceeds to step 322 for transferring the update to other component and performing the update in a suitable manner. If step 320 determines that the update is not directed to another component, operation returns to step 304. In this regard, operation also returns to step 304 subsequent to any of steps 310, 314, 318 and 322. In some embodiments, the DAN hub can serve as a controller to dynamically configure certain operational parameters of system components, as described immediately hereinafter.

As noted above governmental entities can impose a wide range of different requirements with respect to performing an inground operation in a given region. The existence of a drilling area network can facilitate compliance with such regulations, for instance, by identifying a geographic location at which the project is being conducted and facilitating manual and/or automatic adjustment of the operational parameters of related equipment to match such geographic location's regulatory requirements. It should be appreciated that such operational parameter updates can be handled via method 300 of FIG. 3.

Referring again to FIG. 1, control console 120 at the drill rig can include a GPS receiver 400, which is shown by way of non-limiting example as part of telemetry transceiver 122, for receiving GPS signals 402. The GPS receiver may include an updatable map that can be pre-loaded and/or can obtain map information on-the-fly via wireless connection 214. GPS receiver 400 is able to establish the current location of the drill rig or other such system component on which the GPS receiver is located. Any suitable component of the system can serve as a locatable component such as, for example, portable device 20. In an embodiment, system 10 is able to identify a specific geographic region in which the current operation is being performed and customize system operation as well as system components to conform to region specific parameters. The region specific parameters can be stored and accessed in any suitable manner. In one embodiment, the region specific parameters can be stored by one or more of the local DAN components such as DAN hub 210 and/or portable device 20. In another embodiment, the region specific parameters can be stored remotely on DAN server 220 and accessed through the Internet. In still another embodiment, the region specific parameters can be stored on both DAN server 220 and on a local DAN component. The information on the DAN server can be periodically updated by remote administrative personnel such that the DAN hub can periodically update or synchronize locally stored information. As will be further described, in some cases, region specific parameters are mandated through government authority while, in other cases, region specific parameters can represent other localized information. In still other cases, local information can be provided to the operator for a wide range of purposes.

Region specific parameters imposed by government authority such as regulatory agencies and/or law or regulation can include, by way of non-limiting example, specification of acceptable transmission frequencies and power (i.e., signal strength) limits in the region. Responsive to such specifications, DAN hub 210 can apply appropriate settings to configurable components including but not limited to telemetry transceiver 122 at the drill rig and portable device 20 to use telemetry signals 125 and 42, respectively, and can further configure underground transceiver 32' and portable device 20, respectively, to transmit and receive locating signal 30, at the appropriate frequencies and power levels. In an embodiment, the system can be configured such that the operator is unable to override the specified frequency, power or other parameters for the region. In another embodiment, the local authority may provide options such as, for example, different frequencies or frequency bands, or other exceptions to the specified frequency, power or other parameters may be accounted for. Other government imposed parameters can include, for example, modulation type and data rates, all of which can be accommodated. In an embodiment, identification of required settings such as, for example, transmission settings for frequency and signal strength, can cause the system to automatically reconfigure to conform to the required settings.

Other localized information can include, by way of non-limiting example, language, time, date, time zone, units of temperature (such as degrees Centigrade or Fahrenheit) and units of measure (such as meters or feet). Local information may further include, by way of non-limiting example, any location based service such as local weather forecasts and/or weather alerts or local advertising.

Region profiles can be provided that are representative of particular geographical regions, including but not limited to associations of countries such as, for example, the European Union, individual countries, counties and cities. Each profile can provide a customized version of any combination of national and/or local government requirements, standard practice requirements and local information. Profile information that is representative of operational requirements such as, for example, frequency and power settings can trigger automatic configuration of specified values.

Still referring to FIG. 1, system 10 can provide for remote tracking with regard to the operation and/or configuration of any component of the DAN. For example, the usage of system components such as, for example, locator 20 and drill rig 80 can be tracked in terms of operational hours. The GPS position of any GPS enabled components can be tracked. By way of non-limiting example, other information can include model and serial numbers of system components, manufacturer identification for system components, customer ID's, and contractor information. Further, information of interest relating to any of the data logs described above can be monitored. The occurrence of error conditions can be tracked for any component. For example, a DAN component can be configured to issue an error code to DAN hub 210. Using locator 20 as an example, an error code can be issued by the locator with respect to the status of the internal battery reaching end-of-life condition. Another error code can relate to the need for an update of an installed software version. Parameters specific to the drill rig can be monitored and recorded using the CAN-bus. All collected information can be stored locally by DAN hub 210 and uploaded to DAN server 220 in the form of a field report when an Internet connection is available. In some instances, the field report can effectively be no more than a field update or notification in which no more processing is applied than what is necessary, such as formatting, to transfer essentially unprocessed, raw data to a remote location. Such raw data transmission can be useful when sufficient bandwidth for the remote transfer is available. By way of non-limiting example, raw data can include measurements associated with the inground tool including, for example, orientation, temperature, fluid pressure, push force and the like. In such embodiments, the DAN server or other remote component can perform any subsequent data processing, analysis and manipulation that is desired and/or needed. In other instances, a field report can be produced locally by the DAN hub to apply any level of processing and analysis that is necessary and can generate appropriate recommendations.

Such locally produced field reports can be produced solely by the DAN hub, by an application running on the DAN hub or in cooperation with an application running on the DAN hub. In any case, the application can be a third party application. The DAN hub can utilize any locally available components and resources having processing power that can be brought to bear on the task of producing a field report in cooperation with the DAN hub. Of course, the DAN hub can identify the available bandwidth of the Internet connection and initiate transfer of data responsive to a predetermined prioritization. Essentially any aspect of system components and/or operation that is susceptible to data characterization can be monitored by the system. Accordingly, a field report can include locator-based and/or rig-based information to characterize at least one of the inground operation, an operational condition of the downhole transceiver, an operational condition of the uphole transceiver, an operational condition of the drill rig and an operational condition of portable device 20.

The information stored at the DAN hub and/or transferred to the DAN server can be used in a wide variety of different ways. For example, notifications can be provided to the system operator based on the uploaded information. Again using locator 20 as an example, the operator can be notified by email that the locator battery is near end-of-life and should be replaced. Notifications can also be provided, for example, to indicate to the operator that an upgraded software version is available for the locator. In an embodiment, information relating to the current operational region can be compared to the current operational mode of the system and/or its components. In an embodiment, if the frequency, power or other settings for the current operational region do not match current system settings, a notification can be provided locally, for instance, on a component such as display 126 and stored by DAN hub 210. In one feature, the notification can be transferred to DAN server 220 such that remote notifications can be issued in any suitable manner such as, for example, via email. Recommendations can comprise a form of notification and can encompass a broad range of subject matter. By way of non-limiting example, steering commands such as push, rotate and spin can comprise one form of recommendation to advise the operator during an ongoing drilling operation such that the drill head remains on and/or is returned to an intended path. Another form of recommendation can warn that retraction of the drill string should immediately cease, for instance, in response to exceeding a tension threshold during pull-back of a utility. Similarly, a recommendation may be generated warning to reduce or cease the flow of drilling mud in response to fluid pressure readings exceeding a threshold. Other recommendations can advise changing a carrier frequency and/or parameter to conform to region specific requirements, changing the locator battery, performing an equipment check based on the detection of any out-of-range condition at the drill rig such as, for example, oil pressure, hydraulic pressure, mud pressure and the like. Other recommendations can relate to identification of a cross-bore or frac-out and can encompass corrective steps related to such conditions.

Information stored in DAN server 220 can serve as the basis for access by a variety of different users and/or user groups. The DAN server can include applications that are customized for the manufacturer and at least selected ones of the users and/or user groups. Specific user groups that are of interest can include, by way of non-limiting example, distribution partners, customers, utility operators, contractors and any government authorities such as municipalities that manage utility distribution systems. Information can be customized for presentation to these various entities in any suitable manner and in a virtually unlimited number of ways.

An application on the DAN server that is customized for the manufacturer can provide for the entry of information relating to any aspect of a user and/or user group. For example, statistics relating to a particular distribution partner can be entered.

The manufacturer and/or distribution partners can access the DAN server for purposes of supporting a customer base. In an embodiment, an application can monitor any service/maintenance related information for selected DAN components associated with a customer group. For example, the application can monitor software versions, maintenance schedules and error codes for DAN components. The DAN server can generate a wide range of different custom reports based on the information that is available at the DAN server. As another example, an application can allow a distribution partner to track the usage of DAN equipment such as, for example, locating equipment to offer upgrades and services with respect to such equipment. The DAN server can generate custom reports for the manufacturer and/or distribution partner to provide for such usage tracking. Responsive to detecting an out-of-date condition or the need for repair or maintenance of a DAN component, the application can notify the manufacturer or distributor of one or more recommended actions such that they can respond directly. In an embodiment, a notification can be sent directly to the customer, contractor or equipment operator. Again, the DAN server can generate relevant custom reports for the manufacturer and/or distribution partner for follow-up.

A user group that can be made up, for example, of utility operators and municipalities can access the DAN server for purposes of characterizing a utility installation of interest. In this case, a DAN server application can access log records which are associated with the utility installation and can generate related custom reports for transfer to one or more entities that have an interest in any of the captured information. In some cases, the manufacturer can specify that certain custom reports and/or records are not available to a particular entity and/or type of entity. The application can be configured, for example, to generate as-built drawings of the installation in any desired view including perspective views. Additional information can identify, in any suitable combination, the installation date, particular equipment that was used to perform the operation and installation including the status of the DAN components during the operation, any reported error codes associated with the operation, identification of the installing contractor, details with respect to the type of utility installed, maximum pull-back tension applied to the utility, statistics relating to mud pressure and/or drill head temperature during the drilling operation, any available GPS coordinates that are associated with the operation and so on. It should be appreciated that any available, relevant information can be included without limitation. Further, any available statistic of interest or combination of statistics can be plotted for display.

Figure 4:
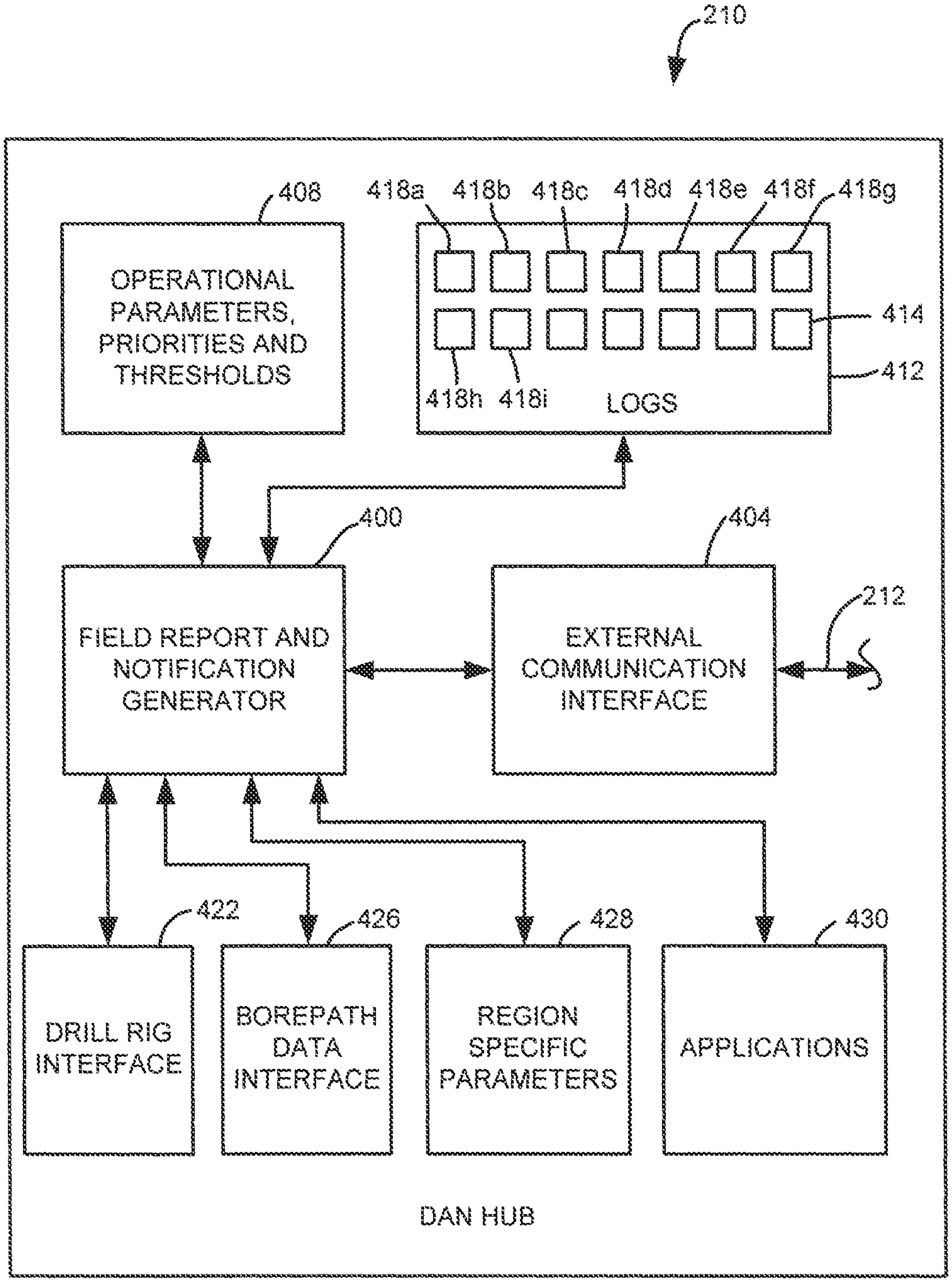
FIG. 4 is a block diagram that illustrates an embodiment of a drilling area network (DAN) hub according to the present disclosure.

Attention is now directed to FIG. 4 which is a block diagram of an embodiment of DAN hub 210. The hub can include a field report and notification generator 400 that serves as an engine for related processing. Generator 400 is in bidirectional communication with an external communication interface 404 that can, in turn, be interfaced to the Internet 212 for any needed external communication. A reference section 408 can store operational parameters, priority tables such as aforedescribed Table 1 including priority assignments and threshold values. Any other data of interest can also be stored in reference section 408. For example, previously generated field reports can be stored prior to transfer to the DAN server. A data log section 412 can store any data logs 414 that are of interest which can be updated on-the-fly as incoming data is parsed amongst the various logs. By way of example, the data logs can include inground tool depth 418*a*, inground tool pitch 418*b*, inground tool temperature 418*c*, annular fluid pressure 418*d*, pull-back tension 418*e*, portable device status 418*f*, inground tool transceiver status 418*g*, drill rig status 418*h*, GPS or other-determined coordinates 418*i* of system components, and other logs. A drill rig interface 422 can be in data communication with the drill rig for collecting any information that is available from various monitoring and sensor functions of the drill rig. Such information can be available, for example, through CAN-Bus 242 of FIG. 2. Parameters that can be sensed or monitored can include, but are not limited to drill string clamp status, drill string extension/retraction, hydraulic pressure, drilling fluid status/pressure and flow rate at the drill rig, drill string push force, drill string rotation rate, rig motor RPM and the like. Of course, the drill rig interface data can be targeted to logs 414 and can be indexed against time and/or drill string length, as examples. A borepath data interface 426 can collect any information that is available with respect to an ongoing inground operation that is being performed. Generally, this data can be targeted to supplement data logs 414, with data logs 418*a*-418*i* serving as examples of a wide range of data that can be received and logged responsive to movement of an inground tool along a borepath. It should be appreciated that different data can be collected during different types of inground operations such as, for example, a drilling operation, a back-reaming/pull-back operation and a mapping operation. A region specific parameter/geographic database 428 is provided for reference against a currently identified location of any component of the system. It should be appreciated that the DAN hub provides a great degree of flexibility with respect to the implementation of DAN services. For example, the DAN hub can serve as a platform for applications 430 that can be provided by and/or tailored for a wide variety of different user entities such as the operator, contractor, distribution partner and/or manufacturer. As is the case with the DAN server and in an embodiment, third-party applications can be supported and can be accessed, updated and maintained through the Internet. It should be appreciated that the DAN hub can itself serve as a WiFi hotspot such that applications 430 can be provided even for purposes of controlling system components such as the drill rig or a portable device using a smartphone or tablet.

Figure 5:
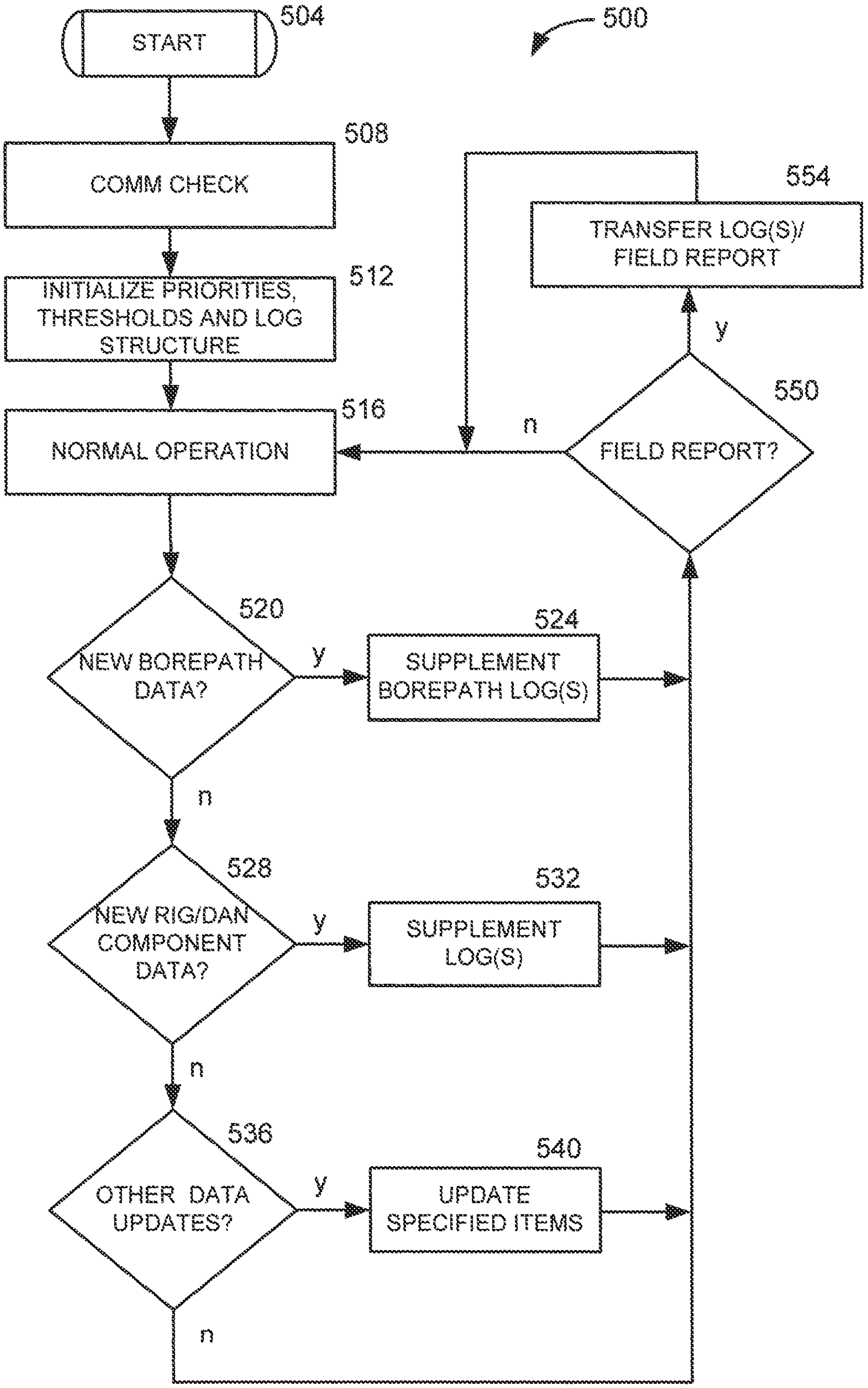
FIG. 5 is a flow diagram that illustrates an embodiment of a method for the operation of the drilling area network hub of FIG. 4.

FIG. 5 is a flow diagram that illustrates an embodiment of a method for the operation of the DAN hub, generally indicated by the reference number 500. The method begins at start 504 and moves to 508 to confirm which communication channels are available. For example, it can be determined whether the drill head transceiver is above or below ground. As another example, the external data communication bandwidth, if any, can be determined. At 512, priority values, thresholds and the log data structure can be initialized. The priority system can be established, for example, based on. The current location of the system and/or certain components can be determined and referenced against region specific parameter database 428 to determine proper system configuration. The system configuration can be changed responsive to operator prompting, automatic reconfiguration or some combination thereof. Normal operation is then entered at 516. At 520, a determination is made as to whether new borepath data is available. If so, operation proceeds to 524 which supplements the appropriate logs that characterize the borepath as well as any measurements taken therealong. By way of non-limiting example, these logs can include borepath mapped locations, borepath pitch, borepath yaw, pull-back tension, inground transceiver status, GPS coordinates, temperature readings, pressure readings and the like. If no new borepath data is available, operation proceeds to 528 which tests for new drill rig and/or DAN component data. A wide range of data can be subject to capture responsive to this step including, but not limited to drilling fluid status, battery status and temperature of the downhole transceiver and battery status of the portable device. If new data is available, operation moves to 532 to supplement the appropriate logs. If no new rig and/or DAN component data is available, operation proceeds to 536 which can monitor for any other form of field data update that the drilling area network can generate. If update data is available, the appropriate logs are updated at 540. Subsequent to any of a determination that no other update data is available at 536, or completion of supplementing the appropriate logs by steps 524, 532 and 540, operation proceeds to 550 which determines whether a new field report should be generated based on new log updates. This determination can be made in any suitable manner. For example, a field report can be generated responsive to detecting violation of any threshold. As another example, the generation of a field report can be triggered by the accumulation of some amount of data relating to a particular data log since the last field report was generated. As another example, a field report can be generated based on some value of incremental extension of the drill string. If it is not necessary to generate a field report, normal operation resumes at 516. On the other hand, if it is necessary to generate the field report, the field report can be generated and transferred at 554. In an embodiment, data logs can be transferred based on the particular type of data log in view of Table 1 or based on any suitable priority system. Subsequently, normal operation resumes at 516.

Figure 6:
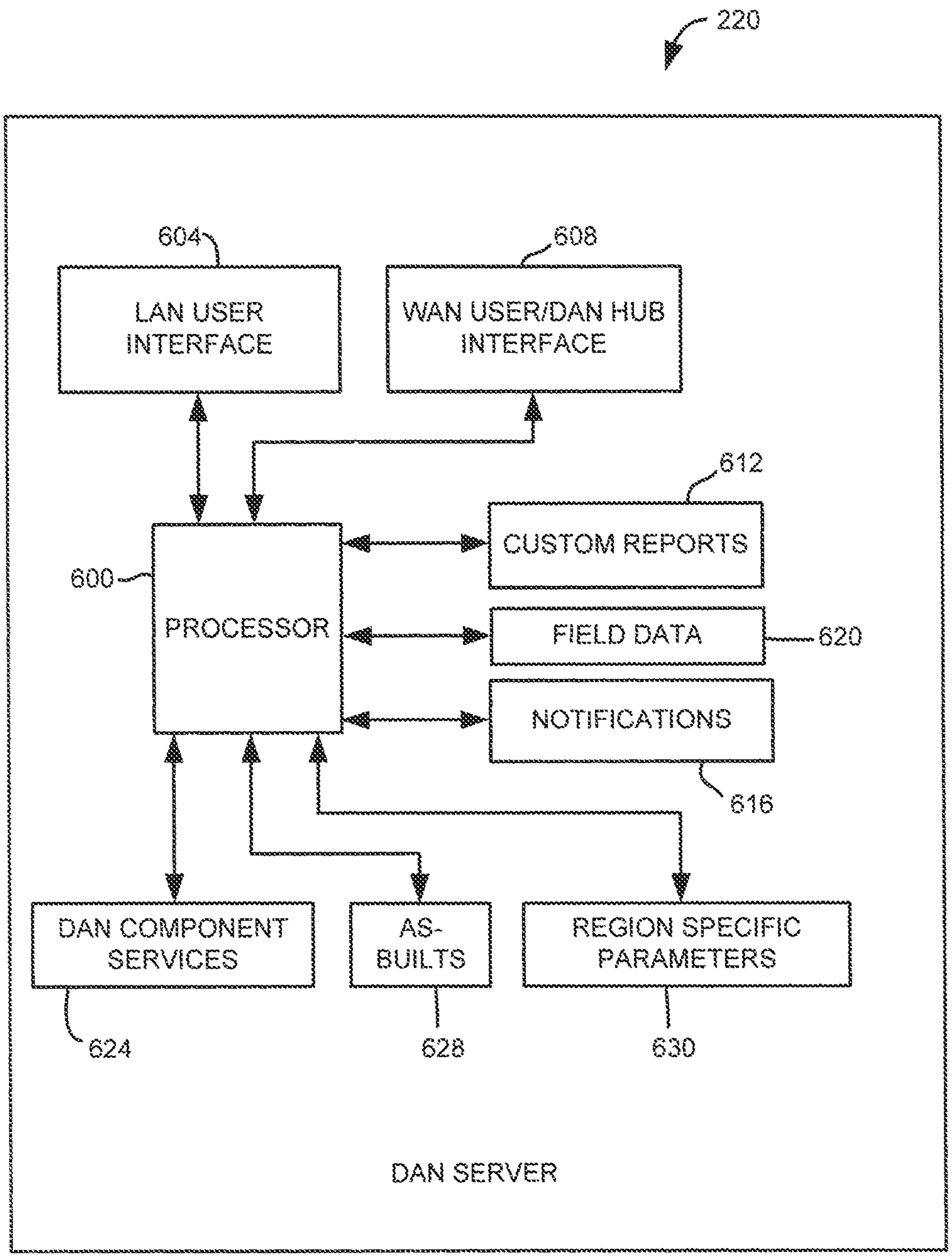
FIG. 6 is a block diagram that illustrates an embodiment of a drilling area network (DAN) server according to the present disclosure.

FIG. 6 is a block diagram of an embodiment of DAN server 220. A processor 600 can be configured to control all the various functions of the DAN server. A LAN user interface 604 can provide for local access to the server such as, for example, by the manufacturer. A WAN user interface 608 can provide access by any external user of the system and can allow the server to communicate with any DAN hubs that are in operation around the world. A custom reports section 612 can provide for storing previously generated custom reports as well as facilitating generation of new custom reports. A notifications section 616 can provide for storing previously generated notifications as well as facilitating generation of new notifications. A field data section can comprise an overall database that stores all collected field information that is received by the DAN server. The information can be compressed and/or encrypted, indexed and cross-indexed in any suitable manner. For example, information can be indexed based on the inground operations that are performed by a particular contractor. As another example, contractors can be indexed against distribution partners that serve as suppliers to a particular contractor base. A DAN component services section 624 can store any information relating to DAN components. For example, the operational status of any DAN component can be stored for purposes of determining whether that component requires any sort of maintenance and/or software update. The DAN component information can be indexed and cross-indexed in any suitable manner such as, for example, based on the contractor who owns the equipment and the distribution partner who sold the equipment to the contractor or services the equipment for the contractor. An as-built section 628 can store any information relating to as-builts that can be or have been constructed relating to particular inground operations. As-built information can be indexed in any suitable manner such as, for example, based on contractor and/or a utility owner or government entity. A region specific parameter section 630 can comprise worldwide specifications for operational parameters and other regional information for reference by remote DAN hubs.

Figure 7:
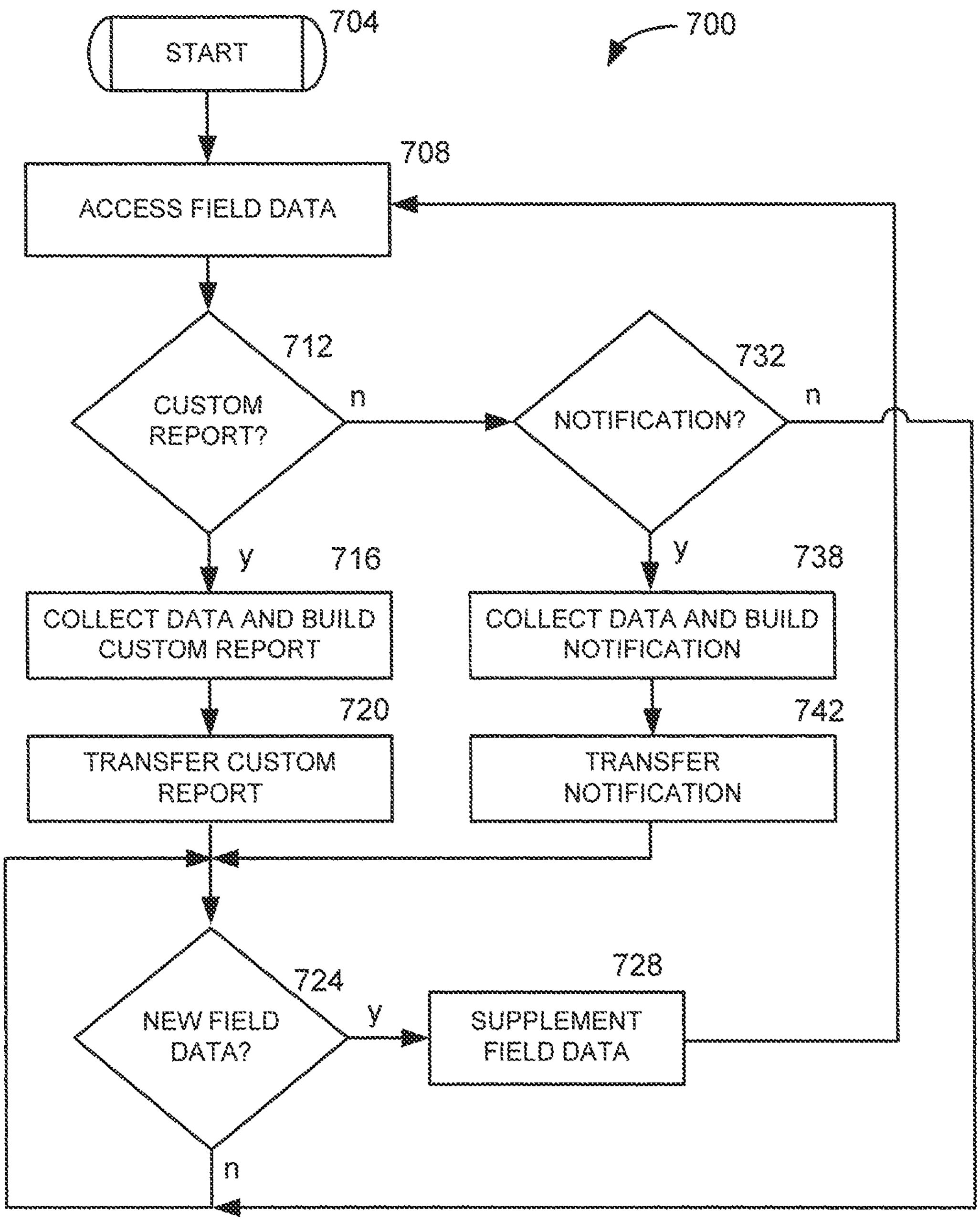
FIG. 7 is a flow diagram that illustrates an embodiment of a method for the operation of the drilling area network server of FIG. 7.

Attention is now directed to FIG. 7 in conjunction with FIG. 6. The former illustrates an embodiment of a method for operation on DAN server 220, generally indicated by the reference number 700. The method begins at 704 and proceeds to 708 which accesses field data 620. Based on the field data, at 712, it is determined by custom report section 612 whether a custom report should be generated. Triggering events for the generation of a custom report can be based on a wide range of operational circumstances. For example, the accumulation of a certain amount of data with respect to a given inground operation can trigger a custom report. As another example, the completion of an inground operation can result in the generation of a custom report. As still another example, any indication of a threshold violation condition or an error condition can cause the system to generate a custom report. As described above, custom reports can be directed to any selected entity or entities that have access to the DAN server. If it is necessary to generate a custom report, operation proceeds to 716 which collects the necessary data and builds the custom report. The latter is transferred to the specified entity or entities at 720. In an embodiment, custom reports can be transferred by text message and/or email. A determination is then made at 724 as to whether new field data has been received by the DAN server. If so, the field data is supplemented at 728. Operation then returns to 708.

Returning to the discussion of step 712, if it is determined by custom report section 612 that is not necessary to generate a custom report, operation moves to 732 which determines, via notifications section 616, whether a notification should be issued to a particular entity or entities. By way of non-limiting example, notifications can be provided responsive to error conditions as well as the violation of any threshold. Responsive to determining the need to generate a notification, operation moves to 738 for the collection of appropriate data and to build the notification. At 742, the notification is transferred to the appropriate entity or entities. In an embodiment, notifications can be transferred by text message and/or email. Operation then returns to 724 which operates as described above. If 732 determines that a notification is not necessary, operation returns to 724 to establish whether or not new field data has been collected. If so, operation proceeds to 728, as described above. Otherwise, step 724 continues to monitor for the availability of new field data. It should be appreciated that step 724 can timeout after some predetermined interval such that operation then returns to 728, even if no new field information has been collected. In this way, new custom reports and notifications can be generated, for example, to indicate that no progress is being made for a particular inground operation. Generally, however, method 700 will simultaneously be monitoring multiple inground operations located around the world such that incoming data from different inground operations will occur in an overlapping manner and are appropriately handled. It should be appreciated that custom reports and/or notifications can be generated responsive to monitoring DAN component services section 624 to indicate, for example, that an error condition has occurred in association with a particular DAN component and/or that maintenance or service is needed. Further, a custom report can be generated responsive to the completion of an inground operation to collect and transfer data from as-built section 628 for generating an as-built. In this regard, as-built section 628 can comprise any data, in log, form that can be used to construct an as-built for a given in-ground operation. In addition to transfer of the data subsequent to completion of the inground operation, the data can be transferred in incremental custom reports. The comparison of these incremental custom reports can be used to indicate potential problems that occurred during an inground operation which would not otherwise be detectable, for example, including data tampering.

In some embodiments, an individual user can customize a particular application for accessing and presenting information stored by the DAN server and/or the DAN hub. The concepts brought to light above with respect to applications directed to the various users and user groups above can readily be provided as applications specific to popular mobile devices such as, for example, smartphones and tablet computers.

The foregoing description of the invention has been presented for purposes of illustration and description. It is not intended to be exhaustive or to limit the invention to the precise form or forms disclosed. For example, the drilling area network of the present disclosure enables additional capabilities not previously available. For instance, industry-wide data may be collected, analyzed and used for a variety of commercial and research purposes. Companies who sell equipment or provide service can track usage remotely and introduce products and services, and/or provide remote customer service, based on such remotely-collected data.

Accordingly, a wide range of other modifications and variations may be possible in light of the above teachings wherein those of skill in the art will recognize certain modifications, permutations, additions and sub-combinations thereof.

What is claimed is:

1. An apparatus for monitoring a system that performs horizontal directional drilling including a drill rig and a subsystem for monitoring the location of an inground tool along an underground borepath during an inground operation, said apparatus comprising:

a drilling area network hub located above ground proximate to the drill rig for storing a plurality of types of data logs that characterize the inground operation and said drilling area network hub is configured at least for intermittent Internet communication with a remote location wherein the types of data logs include a pull-back tension log that is associated with at least one pull-back tension threshold as a maximum rate of change in pull-back tension; and a table that applies a ranking to the differing types of said data logs such that said drilling area network hub transfers one type of data log before another type of data log to the remote location on the Internet according to the table and violation of the pull-back tension threshold increases the ranking of the pull-back tension log for transfer.

2. The apparatus of claim 1 wherein the types of data logs at least include two or more of a pull-back tension log, an annular fluid pressure log, a drillhead temperature log, a depth log, an as-built data log and a GPS coordinates log.

3. The apparatus of claim 1 wherein the types of data logs include a drillhead temperature log that is associated with a drillhead temperature threshold such that violation of the drillhead temperature threshold increases the ranking of the drillhead temperature for transfer before another type of data log.

4. The apparatus of claim 3 wherein the drillhead temperature threshold is a maximum drillhead temperature of the drillhead.

5. The apparatus of claim 1 wherein another pull-back tension threshold is a maximum value of pull-back tension.

6. The apparatus of claim 1 wherein the types of data logs include an annular fluid pressure log that is associated with an annular fluid pressure threshold such that violation of the annular fluid pressure threshold increases the ranking of the annular fluid pressure for transfer before another type of data log.

7. An apparatus for monitoring a system that performs horizontal directional drilling including a drill rig and a subsystem for monitoring the location of an inground tool along an underground borepath during an inground operation, said apparatus comprising:

a drilling area network hub located above ground proximate to the drill rig for storing a pull- back tension log that is associated with at least one pull-back tension threshold as a maximum rate of change in pull-back tension for transfer to a remote location responsive to violation of the pull-back tension threshold.

8. An apparatus for monitoring a system that performs horizontal directional drilling including a drill rig and a subsystem for monitoring the location of an inground tool along an underground borepath during an inground operation, said apparatus comprising:

a drilling area network hub located above ground proximate to the drill rig for storing a drillhead temperature log that is associated with a drillhead temperature threshold as a maximum rate of change in drillhead temperature for transfer to a remote location responsive to violation of the drillhead temperature threshold.

9. An apparatus for monitoring a system that performs horizontal directional drilling including a drill rig and a subsystem for monitoring the location of an inground tool along an underground borepath during an inground operation, said apparatus comprising:

a drilling area network hub located above ground proximate to the drill rig for storing a plurality of types of data logs that characterize the inground operation and said drilling area network hub is configured at least for intermittent Internet communication with a remote location wherein the types of data logs include a drillhead temperature log that is associated with a drillhead temperature threshold and the drillhead temperature threshold is a maximum rate of change in drillhead temperature; and a table that applies a ranking to the differing types of said data logs such that said drilling area network hub transfers one type of data log before another type of data log to the remote location on the Internet according to the table such that violation of the drillhead temperature threshold increases the ranking of the drillhead temperature for transfer.

10. The apparatus of claim 9 wherein the types of data logs include an annular fluid pressure log that is associated with an annular fluid pressure threshold such that violation of the annular fluid pressure threshold increases the ranking of the annular fluid pressure for transfer before another type of data log.

11. The apparatus of claim 9 wherein the types of data logs include a pull-back tension log that is associated with at least one pull-back tension threshold such that violation of the pull-back tension threshold increases the ranking of the pull-back tension log for transfer before another type of data log.

12. The apparatus of claim 11 wherein the pull-back tension threshold is a maximum value of pull-back tension.

13. The apparatus of claim 11 wherein the pull-back tension threshold is a maximum rate of change in pull-back tension.

* * * * *